Figure 1:
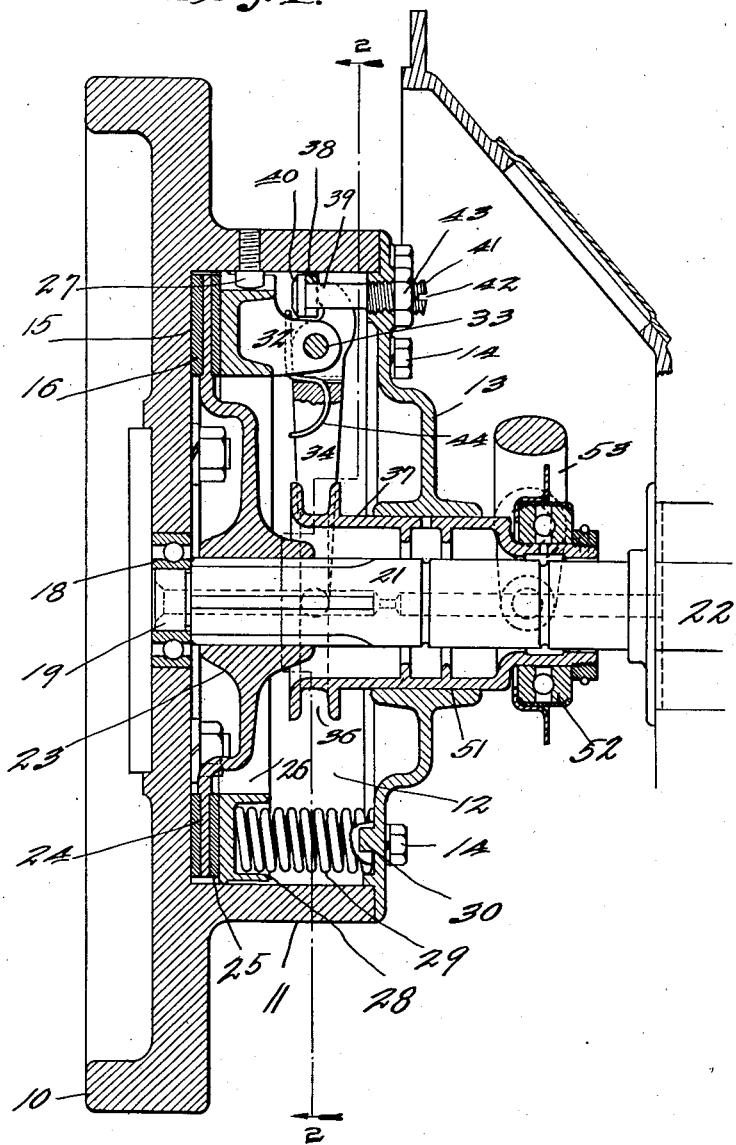

S. O. WHITE.
CLUTCH.
APPLICATION FILED APR. 20, 1917.

1,339,801.

Patented May 11, 1920.
2 SHEETS—SHEET 1.

WITNESSES:
Frank A. Fahle
Josephine Gasper

INVENTOR
Samuel O. White,
BY
Hood & Schley.
ATTORNEYS

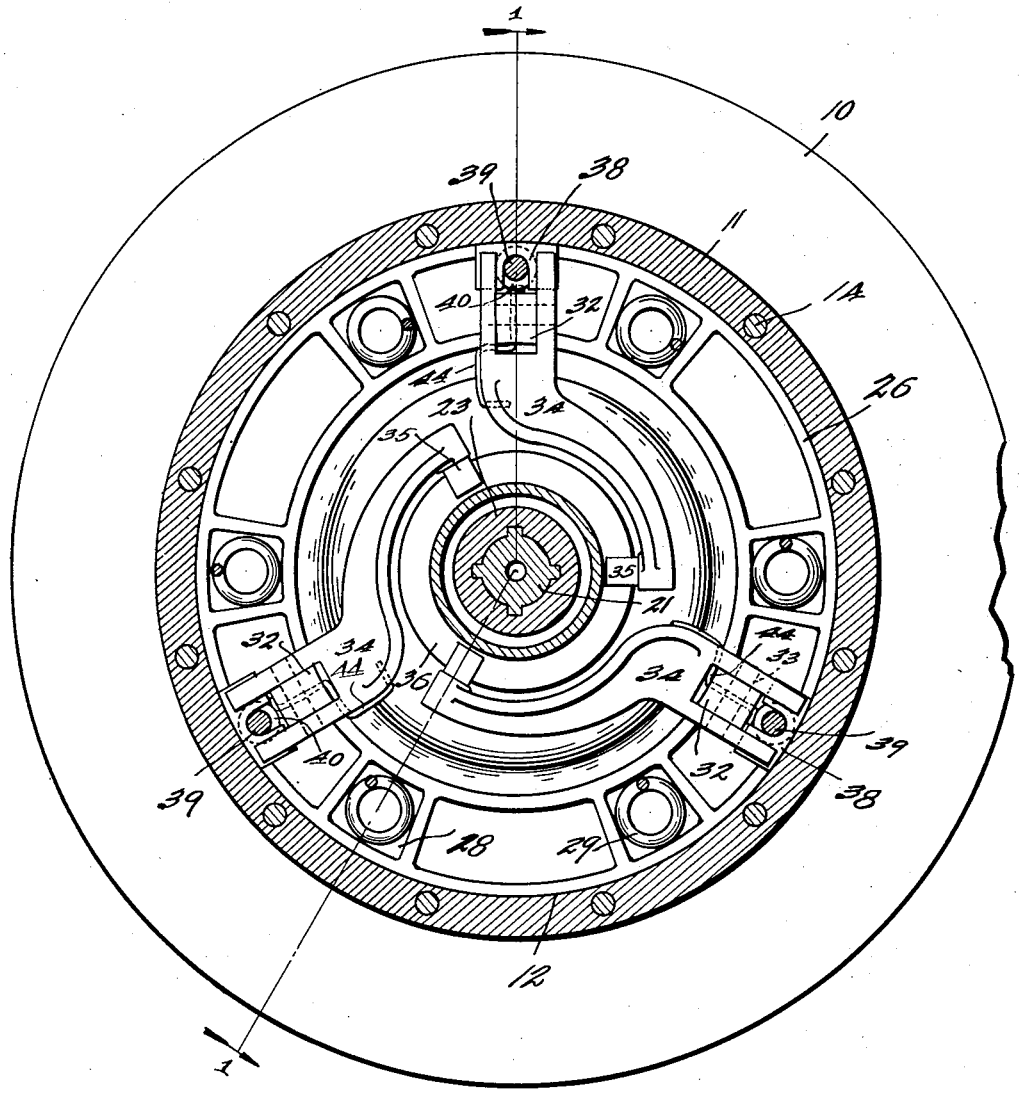

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

CLUTCH.

1,339,801.               Specification of Letters Patent.          Patented May 11, 1920.

Application filed April 20, 1917. Serial No. 163,335.

*To all whom it may concern:*

Be it known that I, SAMUEL O. WHITE, a citizen of the United States, residing at Muncie, in the county of Delaware and State of Indiana, have invented a new and useful Clutch, of which the following is a specification.

The object of my invention is to produce a simple but highly efficient friction clutch of the type now commonly used in automobiles, although, of course, by no means limited to such use.

The accompanying drawings illustrate my invention. Figure 1 is an axial section with a fragmentary portion of an inclosing casing indicated, the section being on line 1—1 of Fig. 2; and Fig. 2 a section on line 2—2 of Fig. 1.

In the drawings, 10 indicates the fly wheel of a motor provided with a cylindrical flange 11 which forms a chamber 12 within which the clutching mechanism is mounted and inclosed, the outer end of the chamber being closed by a plate 13, attached by bolts 14 to flange 11. At the bottom, or inner end of chamber 12, I form a smooth friction surface 15 upon which is loosely laid a friction ring 16, the outer diameter of which is slightly less than the internal diameter of the chamber 12. The fly wheel 10 is provided with an axial bore in which is mounted a bearing 18 which supports the inner end 19 of the transmission shaft 21 which extends into the transmission casing 22. Splined upon shaft 21 closely adjacent bearing 18 is a hub 23 carrying a friction disk 24 adjacent friction ring 16. Mounted in chamber 12 outside of disk 24 is a friction ring 25 similar to ring 16. Mounted in chamber 12 outside of the friction ring 25 is a pressure ring 26 which is splined within chamber 12 by means of the pin 27. The pressure ring is formed at its inner face to engage the friction ring 25 and drive it inwardly so as to pinch the friction disk 24 between rings 16 and 25. The pressure ring 26 is provided with a plurality of spring pockets 28 in each of which is mounted a compression spring 29 which is held in place by a pin 30 on the inner face of plate 13, there being as many of the pins 30 as there are springs 29.

The pressure ring 26 carries a plurality of ears 32 (three being shown in the present instance) which project substantially parallel with the axis of the ring. Upon each of these ears 32 is pivoted, at 33, a retraction lever 34 which is provided at its inner end with a pin 35 projecting into a groove 36 of an operating collar or sleeve 37. Each lever 34 is bifurcated to straddle its ear 32 and the outer ends of the fingers thus formed are rounded, as indicated in dotted lines in Fig. 1, so as to engage the opposite ends of a yoke 38 straddled upon pin 39 and restrained in one direction by head 40 of pin 39. The outer edge of the yoke 38 is shaped so as to conform with the adjacent inner surface of chamber 12 so as to prevent rocking of the yoke upon its pin. Each pin 39 is threaded at 41 and this threaded portion is passed through a threaded opening in plate 13 so that the pin 39 lies substantially parallel with the axis of wheel 10. This pin 39 is conveniently slotted at 42 in its outer end so that it may be readily turned by a screw-driver and a check nut 43 is mounted upon the projected outer end of the threaded portion 41 and engages plate 13 so as to lock pin 39 in any desired position of axial adjustment. A spring 44, mounted in each ear 32 and acting on each lever 34, serves to normally hold such lever with its bifurcated end in engagement with yoke 38, thus preventing rattling of the parts. This spring 44 is not heavy enough to have any appreciable effect in a retracting direction upon the pressure ring 26 against the action of springs 29.

The sleeve 37 is wholly journaled in the axial bore 51 of the hub of plate 13 and is entirely free from shaft 21 so that the continued rotation of the fly wheel 10, and the consequent possible traversing of the pins 35 in slot 36, will not have any tendency to cause or continue rotation of shaft 21 when the pressure ring 26 is retracted.

Sleeve 37 carries a thrust bearing 52 arranged to be engaged by an operating lever 53 in a usual manner, pressure exerted by said lever tending to move sleeve 37 to the right in Fig. 1 and operating upon levers 34 to retract the pressure ring 26 against the action of springs 29 and thus releasing friction disk 24 and consequently severing the driving connection between fly wheel 10 and shaft 21.

Levers 34 when in their normal positions, assumed under the action of springs 29, are preferably arranged so as to lie in a plane at right angles to the axis of shaft 21, so that the centrifugal force exerted upon these levers by the continued rotation of the fly wheel 10, has no material tendency to swing these levers about their pivots, and, therefore, has no material tendency to either increase or decrease the pressure exerted by springs 29 upon pressure ring 26.

I claim as my invention:

1. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, friction rings interposed between said friction disk and main body and between said friction disk and the pressure ring, retracting levers pivoted to the pressure ring and projected inwardly therefrom, an operating sleeve journaled in the main body and free from the transmission shaft, and means carried by the main body against which the retracting levers may act to shift the pressure ring against the action of the springs.

2. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, retracting levers pivoted to the pressure ring and projected inwardly therefrom, an operating sleeve journaled in the main body and free from the transmission shaft, and means carried by the main body against which the retracting levers may act to shift the pressure ring against the action of the springs.

3. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, friction rings interposed between said friction disk and main body and between said friction disk and the pressure ring, retracting levers pivoted to the pressure ring and projected inwardly therefrom, an operating sleeve journaled in the main body and free from the transmission shaft, independent abutments one for each retracting lever carried by the main body, and means by which each of said abutments may be independently adjusted and held in adjusted position with relation to its associated retracting lever.

4. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, retracting levers pivoted to the pressure ring and projected inwardly therefrom, an operating sleeve journaled in the main body and free from the transmission shaft, independent abutments one for each retracting lever carried by the main body, and means by which each of said abutments may be independently adjusted and held in adjusted position with relation to its associated retracting lever.

5. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, friction rings interposed between said friction disk and main body and between said friction disk and the pressure ring, retracting levers pivoted to the pressure ring and projected inwardly therefrom, an operating sleeve, independent abutments one for each retracting lever carried by the main body, said abutments projecting radially inward beyond the periphery of the pressure ring and being supported by the main body axially on the opposite side of the pressure ring from said friction disk, and means by which each of said abutments may be independently adjusted and held in adjusted position with relation to its associated retracting lever.

6. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, retracting levers pivoted to the pressure ring and projected inwardly therefrom, an operating sleeve, independent abutments one for each retracting lever carried by the main body, said abutments projecting radially inward beyond the periphery of the pressure ring and being supported by the main body axially on the opposite side of the pressure ring from said friction disk, and means by which each of said abutments may be independently adjusted and held in adjusted position with relation to its associated retracting lever.

7. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, friction rings interposed between said said friction disk and main body and between said friction disk and the pressure ring, retracting levers pivoted to the pressure ring and projected inwardly therefrom, an operating sleeve journaled in the main body and free from the transmission shaft, means carried by the main body against which the retracting levers may act to shift the pressure ring against the action of the springs, and means for yieldingly holding the retracting levers against their abutments to prevent rattling.

8. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, retracting levers pivoted to the pressure ring and projected inwardly therefrom, an operating sleeve journaled in the main body and free from the transmission shaft, means carried by the main body against which the retracting levers may act to shift the pressure ring against the action of the springs, and means for yieldingly holding the retracting levers against their abutments to prevent rattling.

9. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, friction rings interposed between said friction disk and main body and between said friction disk and the pressure ring, retracting levers pivoted to the pressure ring and projected inwardly therefrom, an operating sleeve, means carried by the main body against which the retracting levers may act to shift the pressure ring against the action of the springs, and means for yieldingly holding the retracting levers against their abutments to prevent rattling.

10. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, retracting levers pivoted to the pressure ring and projected inwardly therefrom, an operating sleeve, means carried by the main body against which the retracting levers may act to shift the pressure ring against the action of the springs, and means for yieldingly holding the retracting levers against their abutments to prevent rattling.

11. In a clutch, the combination with the main rotative body of a pressure ring mounted therein so as to be shiftable axially, a retracting lever pivotally mounted upon said pressure ring, an abutment for said lever, means for swinging said lever about its pivot, a spring acting on said pressure ring independently of said retracting lever, and a spring acting upon said lever to yieldingly hold it in engagement with its abutment to prevent rattling.

12. In a clutch, the combination with a main rotative body having an axial chamber, of a pressure ring mounted in said chamber and axially movable therein, a compression spring mounted in said chamber and acting upon the pressure ring to drive it to active position, a cover plate closing said chamber and forming an abutment for said compression spring, a retracting lever arranged within the chamber to act at an intermediate point of its length upon the pressure ring to retract it against the action of the spring, an abutment for the outer end of said lever, a shifting-sleeve journaled in said cover and engaging the inner end of the retracting lever, a transmission shaft projected axially into the chamber, and a friction disk carried by said shaft and projected between the main body and the pressure ring.

13. In a clutch, the combination with a main rotative body having an axial chamber, of a pressure ring mounted in said chamber and axially movable therein, a compression spring mounted in said chamber and acting upon the pressure ring to drive it to active position, a cover plate closing said chamber and forming an abutment for said compression spring, a retracting lever arranged within the chamber to act at an intermediate point of its length upon the pressure ring to retract it against the action of the spring, an abutment for the outer end of said lever, a shifting-sleeve engaging the inner end of the retracting lever, a transmission shaft projected axially into the chamber, and a friction disk carried by said shaft and projected between the main body and the pressure ring.

14. In a clutch, the combination with a main rotative body having an axial chamber, of a pressure ring mounted in said chamber and axially movable therein, a compression spring mounted in said chamber and acting upon the pressure ring to drive it to active position, a cover plate closing said chamber, a retracting lever arranged within the chamber to act at an intermediate point of its length upon the pressure ring to retract it against the action of the spring, an abutment for the outer end of said lever, a shifting sleeve journaled in said cover and engaging the inner end of the retracting lever, a transmission shaft projected axially into the chamber, and a friction disk carried by said shaft and projected between the main body and the pressure ring.

15. In a clutch, the combination with a main rotative body having an axial chamber, of a pressure ring mounted in said chamber and axially movable therein, a compression spring mounted in said chamber and acting upon the pressure ring to drive it to active position, a cover plate closing said chamber, a retracting lever arranged within the chamber to act at an intermediate point of its length upon the pressure ring to retract it against the action of the spring, an abutment for the outer end of said lever, a shifting-sleeve engaging the inner end of the retracting lever, a transmission shaft projected axially into the chamber, and a friction disk carried by said shaft and projected between the main body and the pressure ring.

16. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, friction rings interposed between said friction disk and main body and between said friction disk and the pressure ring, retracting levers pivoted to the pressure ring and projected inwardly therefrom, an operating sleeve, independent abutments one for each retracting lever carried by the main body, said abutments projecting radially inward beyond the periphery of the pressure ring and being supported by means engaging the main body axially on the opposite side of the pressure ring from said friction disk, and means by which each of said abutments may be independently adjusted and held in adjusted position with relation to its associated retracting lever.

17. A clutch comprising a main rotative body having an axial chamber, a transmission shaft axially projected into said chamber, a friction disk splined upon said shaft, a pressure ring splined in said chamber outside the friction disk, compression springs arranged in said chamber and acting upon said pressure ring to normally clamp the friction disk between the pressure ring and the main rotative body, retracting levers pivoted to the pressure ring and projected inwardly therefrom, an operating sleeve, independent abutments one for each retracting lever carried by the main body, said abutments projecting radially inward beyond the periphery of the pressure ring and being supported by means engaging the main body axially on the opposite side of the pressure ring from said friction disk, and means by which each of said abutments may be independently adjusted and held in adjusted position with relation to its associated retracting lever.

In witness whereof I have hereunto set my hand at Muncie, Indiana, this 19th day of March, A. D. one thousand nine hundred and seventeen.

SAMUEL O. WHITE.